United States Patent [19]

Tanaka

[11] 4,264,811
[45] Apr. 28, 1981

[54] SEMICONDUCTOR IMAGE SENSING DEVICE

[75] Inventor: Shunpei Tanaka, Hachioji, Japan

[73] Assignee: Olympus Optical Co., Ltd., Tokyo, Japan

[21] Appl. No.: 23,441

[22] Filed: Mar. 23, 1979

[30] Foreign Application Priority Data

Apr. 11, 1978 [JP] Japan .................................. 53/41810

[51] Int. Cl.³ ............................................. H01J 31/50
[52] U.S. Cl. .................................. 250/213 VT; 313/94
[58] Field of Search ....................... 250/207, 213 VT; 313/94, 97, 98, 103 CM, 105 CM

[56] References Cited

U.S. PATENT DOCUMENTS

| 3,482,104 | 12/1969 | Finkle | 250/213 VT |
| 3,798,453 | 3/1974 | McIlwain et al. | 250/213 VT |
| 3,887,810 | 6/1975 | Skaggs | 250/213 VT |
| 4,070,578 | 1/1978 | Timothy et al. | 313/103 CM |
| 4,086,486 | 4/1978 | Bybee et al. | 250/207 |
| 4,166,213 | 8/1979 | Hoover | 250/213 VT |

*Primary Examiner*—David C. Nelms

[57] ABSTRACT

A semiconductor image sensing device comprising a photoelectric conversion surface, a channel plate, means for applying an electron accelerating voltage across the channel plate, a collector electrode, storage means, a transfer means, and an analogue shift register.

4 Claims, 7 Drawing Figures

FIG._1 PRIOR ART
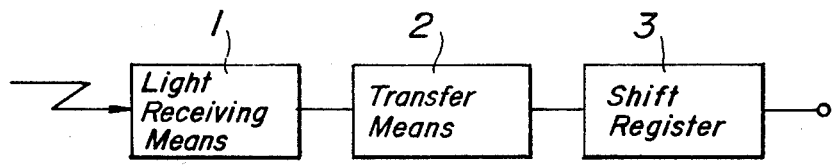
FIG._2 PRIOR ART
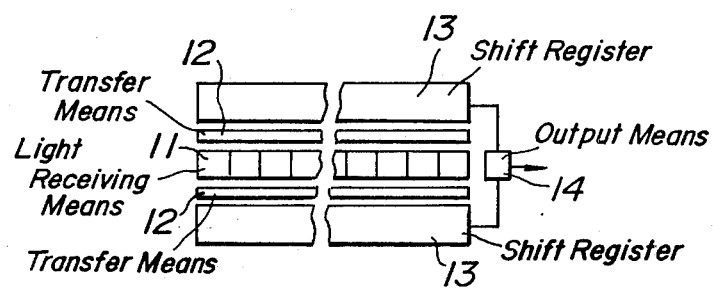
FIG._3
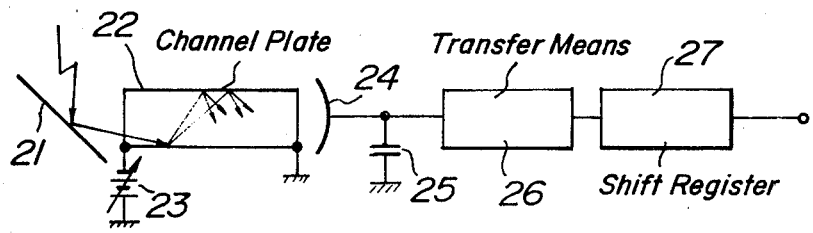
FIG._4
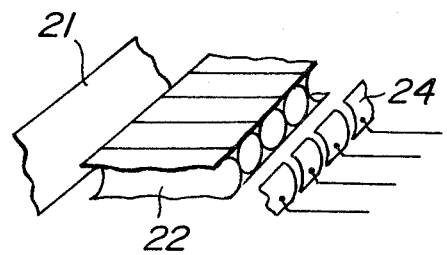

SEMICONDUCTOR IMAGE SENSING DEVICE

BACKGROUND OF THE INVENTION

1. Field of the Invention

This invention relates to a semiconductor image sensing device having an excellent sensitivity and spectroscopic property.

2. Description of the Prior Art

Various kinds of image sensing devices which make use, as their image sensing elements, of photoelectric converting ability, accumulation and transfer ability of analogue signals and semiconductor selfscanning elements such as a charge coupled device, bucket brigade device or the like have been proposed. These semiconductor image sensing devices have the advantage that they are smaller in size, lighter in weight, and more reliable in operation than conventional picture tubes. But, these kinds of image sensing devices have the disadvantage that the sensitivity and electroscopic property thereof are not of satisfactory ones, and that particularly, when they are applied to a color television camera, they become deficient in sensitivity to blue belonging to the short wave region and hence it is difficult to obtain a good color picture image.

Semiconductor selfscanning elements having an excellent sensitivity and spectroscopic property have also been investigated and experimentally succeeded. But, under present conditions it is difficult to produce a number of excellent picture elements in good yield with the aid of these semiconductor selfscanning elements.

SUMMARY OF THE INVENTION

An object of the invention, therefore, is to provide a semiconductor image sensing device which is simple in construction and has an improved sensitivity and spectroscopic property.

A feature of the invention is the provision of a semiconductor image sensing device comprising a photoelectric conversion surface for emitting electrons in response to the amount of light incident thereon, a channel plate for seizing said electrons and passing these electrons therethrough so as to multiply these electrons, means for applying an electron accelerating voltage across said channel plate, a collector electrode opposed to electron emitting opening of said channel plate and seizing the electrons, storage means for accumulating electric charge seized by said collector electrode, a transfer means for transferring at every given time the electric charge accumulated in said storage means, and an analogue shift register for temporarily accumulating the electric charge transferred from said transfer means and supplying as an output the electric charge corresponding to each collector electrode in succession.

Further objects and features of the invention will be fully understood from the following detailed description with reference to the accompanying drawings, in which:

BRIEF DESCRIPTION OF THE DRAWINGS

FIG. 1 is a diagrammatic view of the construction of a conventional image sensing device which makes use of a semiconductor selfscanning element;

FIG. 2 is a diagrammatic view of the construction of a conventional charge coupled device linear image senser;

FIG. 3 is a diagrammatic view of the construction of a semiconductor image sensing device comprising a channel plate according to the invention;

FIG. 4 is a perspective view of the arrangement of respective parts of the image sensing device according to the invention shown in FIG. 3;

DETAILED DESCRIPTION OF THE PREFERRED EMBODIMENTS

Figure 5A:
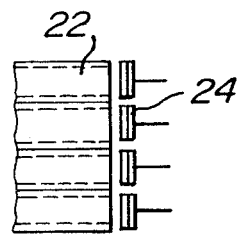
FIG. 5a is a plan view of FIG. 4.

FIG. 1 shows the construction of a conventional semiconductor image sensing device. Referring to FIG. 1, reference numeral 1 designates a light receiving means which when exposed to light for a given time functions to effect photoelectric conversion so as to generate an electric charge corresponding to the amount of light received. This electric charge is supplied to a transfer portion 2 which functions to transfer the electric charge at every given times to an analogue shift register 3 which functions to read out the electric charge in succession by the selfscanning effect and deliver an image signal.

FIG. 2 shows a conventional image sensing device which makes use of a charge coupled device and is called as a linear image senser. Referring FIG. 2, reference numeral 11 designates a light receiving means which includes a row of picture elements arranged side by side and functions, when exposed to light for a given time, that is, for one line scanning period, to accumulate as an electric charge a picture element information. Then, a shift electrode, that is, transfer means 12 becomes open to supply the electric charge to a charge coupled device shift register 13. After the shift electrode 12 has been closed, if a clock pulse is applied to the charge coupled device shift register 13, it is possible to obtain an output signal of one line from an output means 14. It is a matter of course that scanning in vertical direction is effected in an optical manner. In the light receiving means 11, the picture elements may be arranged in two dimensional manner and a picture element information for every one field may be obtained by one exposure of light. In this case, such image sensing device is classified into a frame transfer system, interline system depending on the construction of the transfer means 2, shift register 3 and the like. All of the above mentioned conventional image sensing devices have the drawback that their sensitivity and spectroscopic property are not of satisfactory ones.

FIG. 3 shows the construction of a semiconductor image sensing device according to the invention provided with a channel plate and having a high sensitivity. Referring to FIG. 3, reference numeral 21 designates a photoelectric conversion surface which functions to convert a light image into an electronic image which is then supplied to an electron multiplier 22 called as a microchannel plate. The photoelectric conversion surface may be formed of material used for the photoelectric conversion surface of the photomultiplier in general such, for example, as Sb-Cs, bialkali, multialkali or the like. The channel plate 22 is composed of a secondary electron multiplier surface including glass capillary tubes having secondary electron multiplier ability (channels) and arranged side by side and fused together into one integral body. FIG. 3 shows diagrammatically one channel only. The electron produced at the photoelectric conversion surface 21 is struck against the inner wall of the channel to produce secondary electrons which are several times larger in amplitude than the incident electron. The electron functions to repeat the above mentioned operation for a number of times and becomes $10^3$ to $10^5$ times larger in amplitude than the incident electron during the time at which the electron passes through the channel. Across the channel 22 is applied an accelerating voltage of about 1 kv from a voltage source 23 for the purpose of causing the electron to pass through the channel plate 22 from left to right. The electron delivered from the right end of the channel plate 22 is seized by a collector electrode 24 and the electric charge thus seized is accumulated in a condenser 25. It is a matter of course that the photoelectric conversion surface 21, channel plate 22 and collector electrode 24 must be arranged in a hermetically sealed space kept under vacuum.

As shown in FIG. 4, the channel plate 22 shown in FIG. 3 is composed of a row of channels arranged side by side and the collector electrode 24 is composed of a row of electrodes. As a result, it is possible to obtain a picture element information for every one line, for example, by one exposure of light. The picture element information thus obatined is supplied for every one line period through a transfer means 26 corresponding to the transfer means 2 shown in FIG. 1 to an analogue shift register 27 composed of a charge coupled device of the like and corresponding to the shift register 3 shown in FIG. 1. From this shift register 27 are read out successive picture element informations, thereby obataining an image signal for every one line. It is a matter of course that scanning in vertical direction is effecxted in an optical manner to effect exposure of light for successive one line.

The channel plate 22 is composed of considerably large number of minute channels each having a diameter of 20 $\mu$m, for example, the channels being sufficient in number to amplify the electron picture image received from the photoeelctric conversion surface 21. It is a matter of course that provision must be made of corresponding number of minute collector electrodes 24 and condensers 25.

Figure 5B:
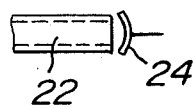
FIG. 5b is its side view.

FIG. 5a is a plan view of the channel plate 22 and collector electrodes 24 shown in FIG. 4 and FIG. 5b is its side view.

In the embodiment shown in FIGS. 4, 5a and 5b, provision is made of a row of channels arranged side by side. Alternatively, provision may be made of two rows of channels collector electrodes arranged in two perpendicularly crossed directions so as to obtain a picture element information at every one field by one exposure of light. In this case, the information for every one field can be obtained at a time, so that a storage means for accumulating the picture element information for every one field is usually located in front of the above mentioned analogue shift register 27.

In the embodiment shown in FIG. 4, the collector electrode 24 is made concave facing the channel plate 22. Alternatively, the collector electrode 24 may be made flat by suitably determining its position relative to the channel plate 22.

The collector electrode 24 is composed of considerably large number of electrodes, so that the mutual connection between these electroces and the transfer means 26 becomes difficult in the case of manufacturing the image sensing device. It is preferable, therefore, to integrally form the collector electrode 24, condenser 25, transfer means 26, shift register 27 or the like on one wafer.

Figure 6:
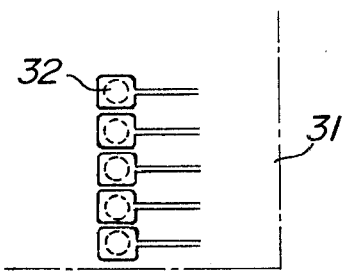
FIG. 6 is a diagrammatic view of collector electrodes integrally formed on one wafer.

FIG. 6 shows a channel plate viewed from the channel plate side. The collector electrodes 32 are formed on one wafer 31. On the wafer 31 are integrally formed the condenser 25, transfer means 26 and charge coupled device analogue shift register 27.

As the condenser 25 to be connected to the collector electrodes, use may be made of a floating capacity or the like of the connection between the collector electrodes and the transfer means.

Figure 7:
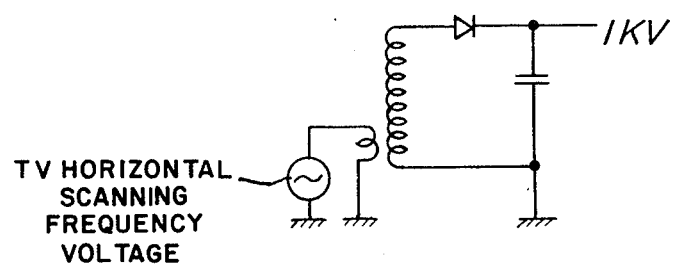
FIG. 7 is a simplified illustration of an electrical circuit that may be employed to generate a high voltage to be applied across the channel plate shown in FIG. 3.

FIG. 7 shows a circuit for generating an accelerating voltage of about 1 kv to be applied across the channel plate 22 shown in FIG. 3. The charge coupled device shift register 27 is supplied from a voltage source on the order of +15 v, so that it is necessary to use a DC-DC converter for generating 1 kv. In this case, there is a risk of the image signal being superimposed with oscillation pulses. In order to prevent such superimposition, it has been the common practice to make the image signal synchronous with the horizontal scanning signal. But, when ripples remain in the high voltage output, the gain of the channel plate becomes changed to produce bright and dark stripes on the reproduced picture image, thereby flickering the picture image. In order to prevent such phenomenon, the frequency of the television signal having the horizontal scanning frequency may be divided into a frequency which is integer times smaller than the horizontal scanning frequency and the frequency divided television signal may be increased in voltage. The use of such measures described ensures an elimination of stripes consisting of bright dark bright dark in the reproduced picture image. Alternatively, a television signal having a frequency which is integer times larger than the horizontal scanning frequency may be increased in voltage. In this case, higher the frequency the smaller the ripples.

It is possible to change the gain of the channel plate by making the above mentioned accelerating voltage variable, thereby adjusting the contrast of the image signal in an electronic manner.

The invention is not limited to the above mentioned embodiments, but various modifications and alternations may be possible. For example, the above mentioned reflection type photoelectric conversion surface may be replaced by a tranmission type photoelectric conversion surface in which the electron is emitted in a direction which is the same as the incident direction of light. In addition, configuration of the inner surface of the channel plate may be changed from circle to polygon or the like.

As stated hereinbefore, the semiconductor image sensing device according to the invention can significantly improve the sensitivity and spectroscopic property if compared with the conventional self-scanning solid state image sensing device which makes use of the charge coupled device or the like. Such effect of the semiconductor image sensing device is particularly useful in the case of arranging the light receiving means in a row since the light exposure time becomes short.

What is claimed is:

1. A semiconductor image sensing device comprising a photoelectric conversion surface for emitting electrons in response to the amount of light incident thereon, a channel plate for seizing said electrons and passing these electrons therethrough so as to multiply these electrons, means for applying an electron accelerating voltage across said channel plate, a collector electrode opposed to electrode emitting openings of said channel plate and seizing the electrons, storage means for accumulating electric charge seized by said collector electrode, a transfer means for transferring at every given time the electron charge accumulated in said storage means, and an analogue shift register for temporarily accumulating the electric charge transferred from said transfer means and supplying as an output the electric charge corresponding to said collector electrode in succession, all of said collector electrode, transfer means and analogue shift register being integrally formed on one wafer, said channel plate and collector electrode being one-dimensionally arranged, electric charge seized by said collector electrode being transferred by said transfer means to said shift register and sequentially read out.

2. The device according to claim 1, wherein said accelerating voltage applied across said channel plate is obtained by rectifying a voltage having a frequency which is an integer times larger than a horizontal scanning frequency of the image sensing device.

3. The device according to claim 1, wherein said accelerating voltage applied across said channel plate is obtained by rectifying a voltage having a frequency which is an integer times smaller than a horizontal scanning frequency of the image sensing device.

4. The device according to claim 1, wherein said accelerating voltage applied across said channel plate is made variable.

* * * * *